United States Patent
Nishimura et al.

(10) Patent No.: US 12,036,655 B2
(45) Date of Patent: Jul. 16, 2024

(54) ELECTRIC WORKING MACHINE

(71) Applicant: YAMABIKO CORPORATION, Tokyo (JP)

(72) Inventors: Atsushi Nishimura, Ohme (JP); Satoshi Ueda, Ohme (JP)

(73) Assignee: YAMABIKO CORPORATION (JP)

( * ) Notice: Subject to any disclaimer, the term of this patent is extended or adjusted under 35 U.S.C. 154(b) by 0 days.

(21) Appl. No.: 18/191,155

(22) Filed: Mar. 28, 2023

(65) Prior Publication Data

US 2023/0347491 A1    Nov. 2, 2023

(30) Foreign Application Priority Data

Apr. 28, 2022 (JP) .................. 2022-074277

(51) Int. Cl.
*B25F 5/00* (2006.01)
*H02P 3/08* (2006.01)
*H02P 27/04* (2016.01)
*H02P 27/06* (2006.01)
*B27B 17/08* (2006.01)

(52) U.S. Cl.
CPC ............... *B25F 5/001* (2013.01); *H02P 3/08* (2013.01); *H02P 27/045* (2013.01); *H02P 27/06* (2013.01); *B25F 5/008* (2013.01); *B27B 17/08* (2013.01)

(58) Field of Classification Search
CPC .. B25F 5/001; B25F 5/008; B25F 5/00; B25F 5/02
USPC .................... 173/179, 176, 217, 2
See application file for complete search history.

(56) References Cited

U.S. PATENT DOCUMENTS

| | | | |
|---|---|---|---|
| 8,674,640 B2 * | 3/2014 | Suda | B25B 21/02 173/4 |
| 2015/0256111 A1 | 9/2015 | Forster et al. | |
| 2017/0012572 A1 | 1/2017 | Takano et al. | |
| 2019/0111551 A1 * | 4/2019 | Kato | B25F 5/001 |
| 2021/0234492 A1 * | 7/2021 | Trump | H02H 7/20 |

FOREIGN PATENT DOCUMENTS

JP    2017-087359 A    5/2017

OTHER PUBLICATIONS

European Search Report issued in the corresponding European Patent Application No. 23161680.6; dated Aug. 22, 2023 (total 7 pages).

* cited by examiner

*Primary Examiner* — Jacob A Smith
(74) *Attorney, Agent, or Firm* — Harness, Dickey & Pierce, P.L.C.

(57) ABSTRACT

According to an aspect of the present invention, an electric working machine is provided. The electric working machine comprises a motor, an operation portion, a working portion, and a controller. The working portion is configured to be driven by the motor and act on a work target. The operation portion is configured to be operated by an operator. The controller is configured to control a maximum power that can be input to the motor to a first power when receiving an operation signal indicating an amount of operation to the operation portion. Further, the controller is configured to perform first switching control to switch the maximum power to a second power that is less than the first power when rotation speed of the motor becomes less than a first threshold due to a load on the working portion.

8 Claims, 10 Drawing Sheets

| TEMPERATURE INFORMATION C | LESS THAN C1 | EQUAL TO OR GREATER THAN C1 AND LESS THAN C2 | EQUAL TO OR GREATER THAN C2 |
|---|---|---|---|
| FIRST THRESHOLD Th1 | Th1-1 | Th1-2 | Th1-3 |
| SECOND THRESHOLD Th2 | Th2-1 | Th2-2 | Th2-3 |
| SECOND PERIOD T2 | T2-1 | T2-2 | T2-3 |
| SECOND POWER A2 | A2-1 | A2-2 | A2-3 |
| THIRD POWER A3 | A3-1 | A3-2 | A3-3 |

FIG. 7

| SOC INFORMATION D | LESS THAN D1 | EQUAL TO OR GREATER THAN D1 AND LESS THAN D2 | EQUAL TO OR GREATER THAN D2 |
|---|---|---|---|
| FIRST THRESHOLD Th1 | Th1-1 | Th1-2 | Th1-3 |
| SECOND THRESHOLD Th2 | Th2-1 | Th2-2 | Th2-3 |
| SECOND PERIOD T2 | T2-1 | T2-2 | T2-3 |
| SECOND POWER A2 | A2-1 | A2-2 | A2-3 |
| THIRD POWER A3 | A3-1 | A3-2 | A3-3 |

FIG. 8

| INTER-CONTROL TIME E | LESS THAN E1 | EQUAL TO OR LONGER THAN E1 AND LESS THAN E2 | EQUAL TO OR LONGER THAN E2 |
|---|---|---|---|
| HARDNESS OF WORK OBJECT | SOFT | INTERMEDIATE | HARD |
| FIRST THRESHOLD Th1 | Th1-1 | Th1-2 | Th1-3 |
| SECOND THRESHOLD Th2 | Th2-1 | Th2-2 | Th2-3 |
| SECOND PERIOD T2 | T2-1 | T2-2 | T2-3 |
| SECOND POWER A2 | A2-1 | A2-2 | A2-3 |
| THIRD POWER A3 | A3-1 | A3-2 | A3-3 |

FIG. 9

| NUMBER OF STOPS F | LESS THAN F1 | EQUAL TO OR MORE THAN F1 AND LESS THAN F2 | EQUAL TO OR MORE THAN F2 |
|---|---|---|---|
| FIRST THRESHOLD Th1 | Th1-1 | Th1-2 | Th1-3 |
| SECOND THRESHOLD Th2 | Th2-1 | Th2-2 | Th2-3 |
| SECOND PERIOD T2 | T2-1 | T2-2 | T2-3 |
| SECOND POWER A2 | A2-1 | A2-2 | A2-3 |
| THIRD POWER A3 | A3-1 | A3-2 | A3-3 |

FIG. 10

ELECTRIC WORKING MACHINE

CROSS REFERENCE TO RELATED APPLICATIONS

The present application claims priority under 35 U.S.C. § 119 to Japanese Patent Application No. 2022-074277, filed Apr. 28, 2022, the contents of which are incorporated herein by reference in their entirety.

BACKGROUND

Technical Field

The present invention relates to an electric working machine.

Related Art

JP2017-87359A discloses a technology in which a controller of an electric working machine stops power supply from a battery pack to a motor when a motor inhibit signal is transmit to the electric working machine from a management apparatus.

As a load increases during work with the electric working machine, heat generation of the motor increases, and the heat may cause component failure if work continues in such a condition.

In view of the above circumstances, the present invention provides a technology to suppress heat generation of a motor.

According to an aspect of the present invention, an electric working machine is provided. The electric working machine comprises a motor, an operation portion, a working portion, and a controller. The working portion is configured to be driven by the motor and act on a work target. The operation portion is configured to be operated by an operator. The controller is configured to control a maximum power that can be input to the motor to a first power when receiving an operation signal indicating an amount of operation to the operation portion. The controller is configured to perform first switching control to switch the maximum power to a second power that is less than the first power when rotation speed of the motor becomes less than a first threshold due to a load on the working portion. The controller is configured to perform second switching control to switch the maximum power to a third power that is greater than the second power when a first period elapses from the first switching control. Further, the controller is configured to perform third switching control to switch the maximum power to the first power when rotation speed of the motor becomes equal to or higher than a second threshold after performing the second switching control.

According to such an aspect, heat generation of a motor can be suppressed.

DETAILED DESCRIPTION

Hereinafter, embodiments of the present invention will be described with reference to drawings. Various features described in the embodiment below can be combined with each other. In the present embodiment, a chain saw for cutting tree, board, etc. will be described as an example of an electric working machine according to the present invention.

A program for realizing software in the present embodiment may be provided as a non-transitory computer-readable medium that can be read by a computer or may be provided for download from an external server or may be provided so that the program can be activated on an external computer to realize functions thereof on a client terminal (so-called cloud computing).

In the present embodiment, "portion" may include, for instance, a combination of hardware resources implemented by a circuit in a broad sense and information processing of software that can be concretely realized by these hardware resources. Further, various information is performed in the present embodiment, and the information can be represented by, for instance, physical values of signal values representing voltage and current, high and low signal values as a set of binary bits consisting of 0 or 1, or quantum superposition (so-called qubits), and communication/calculation can be performed on a circuit in a broad sense.

Further, the circuit in a broad sense is a circuit realized by combining at least an appropriate number of circuit, circuitry, processor, memory, or the like. In other words, it is a circuit that includes an application specific integrated circuit (ASIC), a programmable logic device (e.g., a simple programmable logic device (SPLD), a complex programmable logic device (CPLD), a field programmable gate array (FPGA)), or the like.

1. Hardware Configuration

In this section, a hardware configuration of a chain saw 1 according to the present embodiment will be described.

Figure 1:
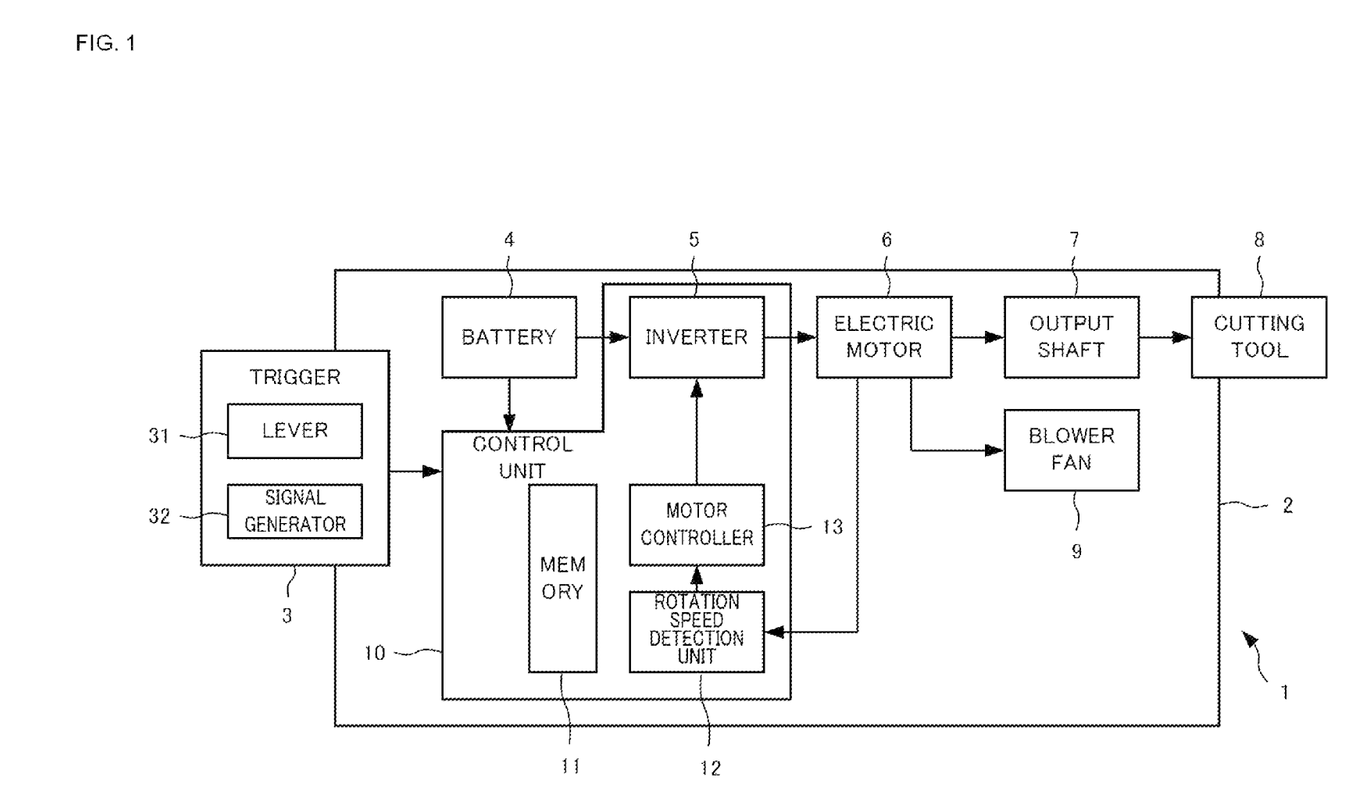
FIG. 1 is a block diagram showing a hardware configuration of a chain saw 1.

FIG. 1 is a block diagram showing the hardware configuration of the chain saw 1. The chain saw 1 comprises a main body 2, a trigger 3, a battery 4, an electric motor 6, an output shaft 7, a cutting tool 8, a blower fan 9, and a control unit 10. The main body 2 includes a housing or the like formed by resin, etc., and is a part that holds each of the other parts. The main body 2 is configured to hold the trigger 3 and the cutting tool 8 to exposed to outside, and detachably hold the battery 4. Further, the main body 2 is configured to hold each of the other parts inside the housing.

The trigger 3 is a part that is operated by an operator when working with the chain saw 1. The trigger 3 includes a lever 31 and a signal generator 32. The lever 31 is an example of an operation portion that is operated by the operator when operating the chain saw 1. The signal generator 32 is configured to generate an operation signal indicating an amount of operation of the lever 31 by the operator. The battery 4 is configured to supply DC power to each of other parts. An inverter 5 is configured to convert the DC power supplied by the battery 4 into a predetermined AC power. The electric motor 6 is a motor operated by the AC power converted by the inverter 5.

The output shaft 7 is configured to transmit a driving force generated by the electric motor 6 to the cutting tool 8. The cutting tool 8 is configured to rotate by the driving force transmitted by the output shaft 7 and cut a work object. In the present embodiment, the work object is a tree, a board, etc. Thus, the cutting tool 8 is an example of a working portion that is driven by a motor (the electric motor 6 in the present embodiment) to act on a work object. The blower fan 9 is configured to rotate by the driving force generated by the electric motor 6 and blow cooling air into the housing.

The control unit 10 is an example of a controller that controls operation of the electric motor 6. The control unit 10 comprises the inverter 5 and controls operation of the electric motor 6 based on an operation signal transmitted from the signal generator 32 when the operator holding the lever 31 and performing operation. The control unit 10 includes a control board, on which IC circuit (Integrated Circuit) such as a memory 11, a rotation speed detection unit 12, and a motor controller 13 are provided, and performs generation, transmission, etc. of a control signal with these IC circuits or the like. The control unit 10 includes the memory 11, the rotation speed detection unit 12, and the motor controller 13.

The memory 11 is configured to store various information. The memory 11 can be implemented, for example, as a storage device such as a flash memory or a solid state drive (SSD) that stores various programs, etc. related to the chain saw 1 executed by the control unit 10, or as a memory such as random access memory (RAM) that stores temporary necessary information (arguments, array, etc.) related program operation. The memory 11 stores various programs, variables, etc. related to the chain saw 1 executed by the control unit 10.

The rotation speed detection unit 12 includes a rotation speed sensor, such as an electromagnetic or photoelectric type, to detect rotation speed per unit time of the electric motor 6. The motor controller 13 is configured to control power input to the electric motor 6 (hereinafter referred to as "input power") by transmitting a control signal for performing a switching operation to the inverter 5. The motor controller 13 is configured to control the input power to the electric motor 6 based on a parameter stored in the memory 11 and rotation speed detected by the rotation speed detection unit 12. Further, the rotation speed detection unit 12 may calculate rotation speed per unit time of the electric motor 6 from waveform output from the electric motor 6.

Figure 2:
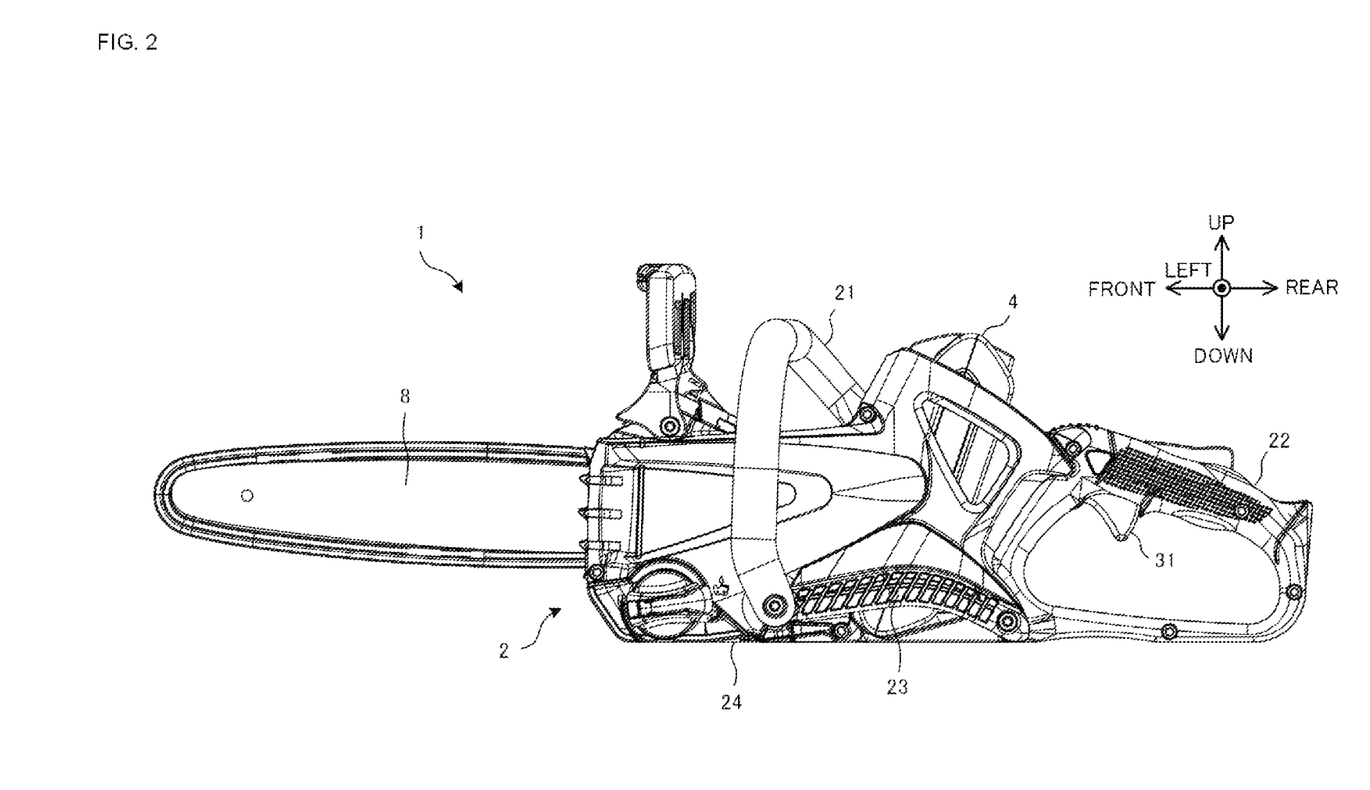
FIG. 2 is a diagram showing an appearance of the chain saw 1.

FIG. 2 is a diagram showing an appearance of the chain saw 1. In FIG. 2, the chain saw 1 viewed from left is shown. In the chain saw 1, an up-down direction, a front-back direction, and a left-right direction are defined. In the present embodiment, the up-down direction of the chain saw 1 is defined as a vertical direction when the chain saw 1 is placed on a flat and horizontal installation surface. Further, the front-back direction is defined as a direction orthogonal to the up-down direction, and the left-right direction is defined as a direction orthogonal to the up-down direction and the front-back direction.

FIG. 2 shows the main body 2, the battery 4, the cutting tool 8, and the lever 31. The main body 2 includes a front handle 21, a rear handle 22, an intake portion 23, and an exhaust portion 24. The front handle 21 is provided on a front side of the main body 2 and is a part for the operator to grip when performing electric work. The rear handle 22 is provided at a rear side of the main body 2 and is a part for the operator to grip when performing electric work. The intake portion 23 includes an intake port and is configured to form a passage for sending cooling air taken in from the intake port into an inside of the main body 2. The exhaust portion 24 includes an exhaust port and is configured to discharge the cooling air, which is taken in from the intake portion 23 and cooled a heat-generating component such as a motor arranged inside the main body 2, to an external space.

2. Information Processing

In this section, information processing according to the present embodiment will be described. In the chain saw 1, the motor controller 13 of the control unit 10 is configured to execute control processing for controlling power of current input from the inverter 5 to the electric motor 6 (hereinafter referred to as "input power").

Figure 3:
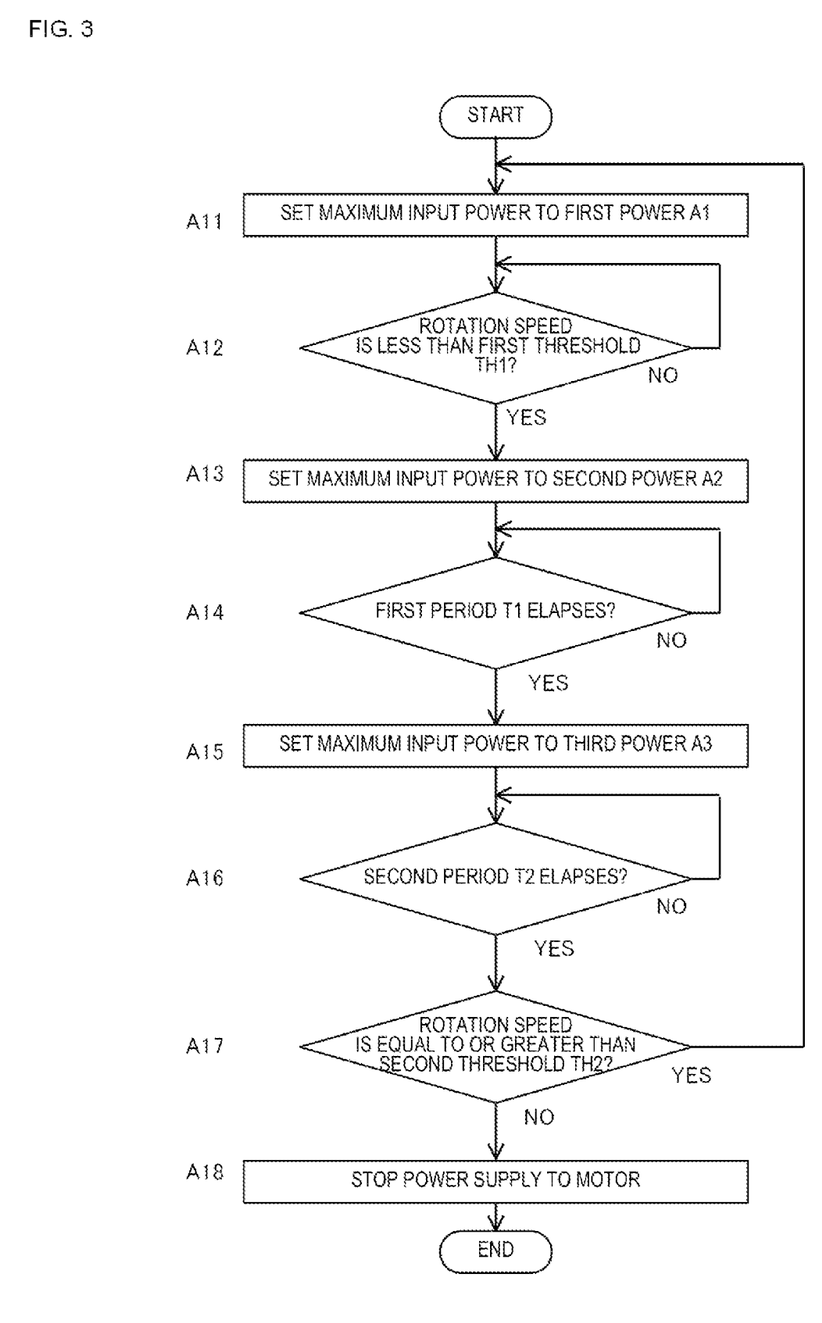
FIG. 3 is a flowchart showing an example of control processing.

FIG. 3 is a flowchart showing an example of the control processing. After the operator performs a safe operation such as pressing a power button (not shown) and then grips the lever 31 shown in FIG. 1, the signal generator 32 transmits an operation signal to the control unit 10. The control unit 10 starts control processing when receiving the operation signal. Further, the control unit 10 terminates the control processing when the operator performs an operation to terminate operation of the chain saw 1, such as releasing the lever 31 from the operation of gripping the lever 31. The control processing includes looping processes, and these looping processes are repeatedly executed at predetermined time interval (such as per 0.1 second).

When receiving an operation to start the electric motor 6, the motor controller 13 first sets a maximum input power stored in the memory 11 to a first power A1 in A11. The maximum input power means a maximum power that can be input to the electric motor 6. The motor controller 13 controls the input power to the electric motor 6 to be equal to or less than the first power A1, which is the set maximum input power, based on the amount of operation of the lever 31.

Furthermore, the motor controller 13 detects, as rotation speed of the electric motor 6, a value obtained by converting the rotation speed detected by the rotation speed detection unit 12 at a predetermined timing into rotation speed per unit time (one minute in the present embodiment). The first power A1 will be described with reference to FIG. 4.

Figure 4:
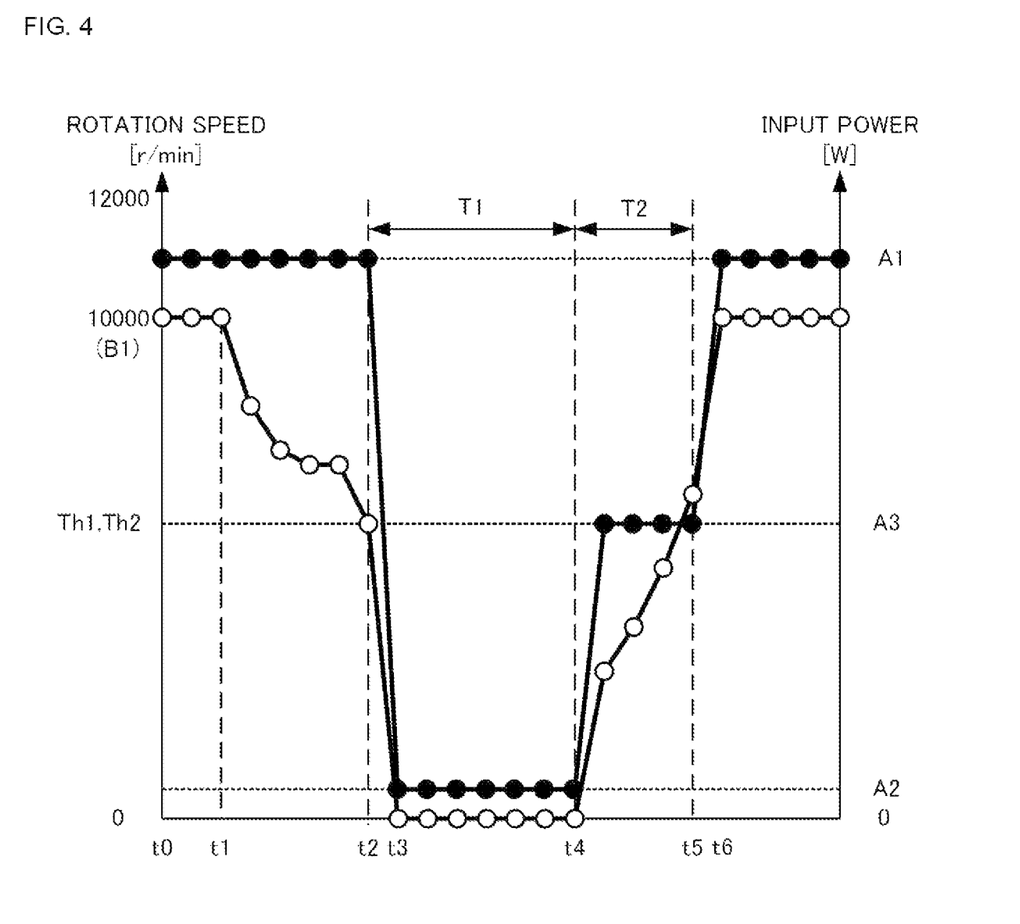
FIG. 4 is a graph showing an example of a relationship between rotation speed of an electric motor 6 and input power.

FIG. 4 is a graph showing an example of a relationship between the rotation speed of the electric motor 6 and the input power. In FIG. 4, a horizontal axis is a time axis, and a vertical axis is a line graph showing rotation speed (unit is revolution per minute: r/min) and input power (unit is watt: W).

The graph in FIG. 4 shows a change in rotation speed and input power from time t0, when the lever 31 is operated and the electric motor 6 starts rotating. In the example in FIG. 4, it is assumed that the operator grips the lever 31 at a maximum amount of operation at the start of operation, the cutting tool 8 is not in contact with the work object, and no load is applied to the cutting tool 8 from the work object. The electric motor 6 is rotating at rotation speed B1 (10000 r/min in the example of FIG. 4) when the input power is the first power A1 and there is no load on the cutting tool 8.

When the cutting tool 8 contacts the work object and starts to act (cutting the work object in the present embodiment), a load is applied to the cutting tool 8, the rotational speed of the cutting tool 8 decreases, and the rotational speed of the electric motor 6 connected to the cutting tool 8 via the output shaft 7 also decreases. In the case of the example in FIG. 4, cutting starts at time t1, and as the operator presses the cutting tool 8 against the work object with increasing force, the load on the cutting tool 8 gradually increases, and the rotation speed of the electric motor 6 gradually decreases accordingly.

If it is determined in A12 that the rotation speed of the electric motor 6 has changed from high rotation speed to rotation speed less than a first threshold Th1 (YES), the motor controller 13 performs a first switching control in A13 to switch the maximum input power from the first power A1 to a second power A2. The second power A2 is power smaller than the first power A1. In other words, the motor controller 13 performs the first switching control when the rotation speed of the electric motor 6 changes from high rotation speed to rotation speed less than the first threshold Th1 due to the load on the cutting tool 8. Further, if it is determined in A12 that the rotation speed of the electric motor 6 is equal to or higher than the first threshold Th1 (NO), the motor controller 13 controls the electric motor 6 to keep the maximum input power to the electric motor 6 as the first power A1.

In the case of the example in FIG. 4, at time t3, as a result of the maximum input power to the electric motor 6 becoming the second power A2 by the first switching control, the rotation speed of the electric motor 6 decreases to 0 r/min. In other words, at time t3, even if the operator holds the trigger 3 with the maximum amount of operation, the operator can recognize that the electric motor 6 is about to stop because the rotation of the cutting tool 8 also stops when the cutting tool 8 is pressed against the work object.

Subsequently, in A14, the motor controller 13 controls to maintain the maximum input power at the second power A2 during a first period T1. Then, in A15, the motor controller 13 performs a second switching control to switch the maximum input power from the second power A2 to a third power A3. In other words, the motor controller 13 performs the second switching control when the first period T1 has elapsed since the first switching control is performed. The third power A3 is power greater than the second power A2. Further, the third power A3 is smaller than the first power A1 in the present embodiment.

In the example of FIG. 4, the control unit 10 performs the second switching control to set the maximum input power to the electric motor 6 to the third power A3 at time t4 after the first period T1 has elapsed from time t2. Here, the first period T1 is set as a time for making the operator aware of a driving situation. For instance, when the operator is pressing the cutting tool 8 against a cutting object, a rotational force of the cutting tool 8 is extremely reduced by performing the first switching control, thus the first period T1 is set to be time required for the operator to notice the decrease in rotational force or a longer time than that.

Subsequently, the motor controller 13 determines whether the second period T2 has elapsed after performing the second switching control in A16. If it is determined that the second period T2 has elapsed (YES), the motor controller 13 determines in A17 whether the rotation speed of the electric motor 6 has changed from low rotation speed to a second threshold Th2 or higher. If the motor controller 13 determines in A17 that the rotation speed of the electric motor 6 has changed from low rotation to the second threshold Th2 or higher (YES), the processing returns to A11, and a third switching control to switch the maximum input power from the third power A3 to the first power A1 is performed. In other words, the motor controller 13 performs the third switching control when the rotation speed of the electric motor 6 changes from low rotation to the second threshold Th2 or higher after the second switching control.

If it is determined in A17 that the rotation speed of the electric motor 6 has not reached or exceeded the second threshold Th2 from low rotation (NO), the motor controller 13 allows the electric motor 6 to stop by terminating power supply to the electric motor 6 (terminating power input) in A18.

If it is determined in A16 that the second period T2 has not elapsed (NO), the motor controller 13 controls the electric motor 6 to keep the maximum input power to the electric motor 6 as the third power A3. Here, the second period T2 is set to be time required for the rotation speed of the electric motor 6 reaches or exceeds the second threshold Th2 since the operator reduces the force pressing the cutting tool 8 against the work object or a longer time than that.

The motor controller 13 performs the third switching control by setting the second threshold Th2 to the same threshold as the first threshold Th1 in the example shown in FIG. 4. As a result of the input power becoming the first power A1 by the third switching control, at time t6, the rotation speed of the electric motor 6 increases to the rotation speed B1 (10000 r/min) at the time of starting.

Figure 5:
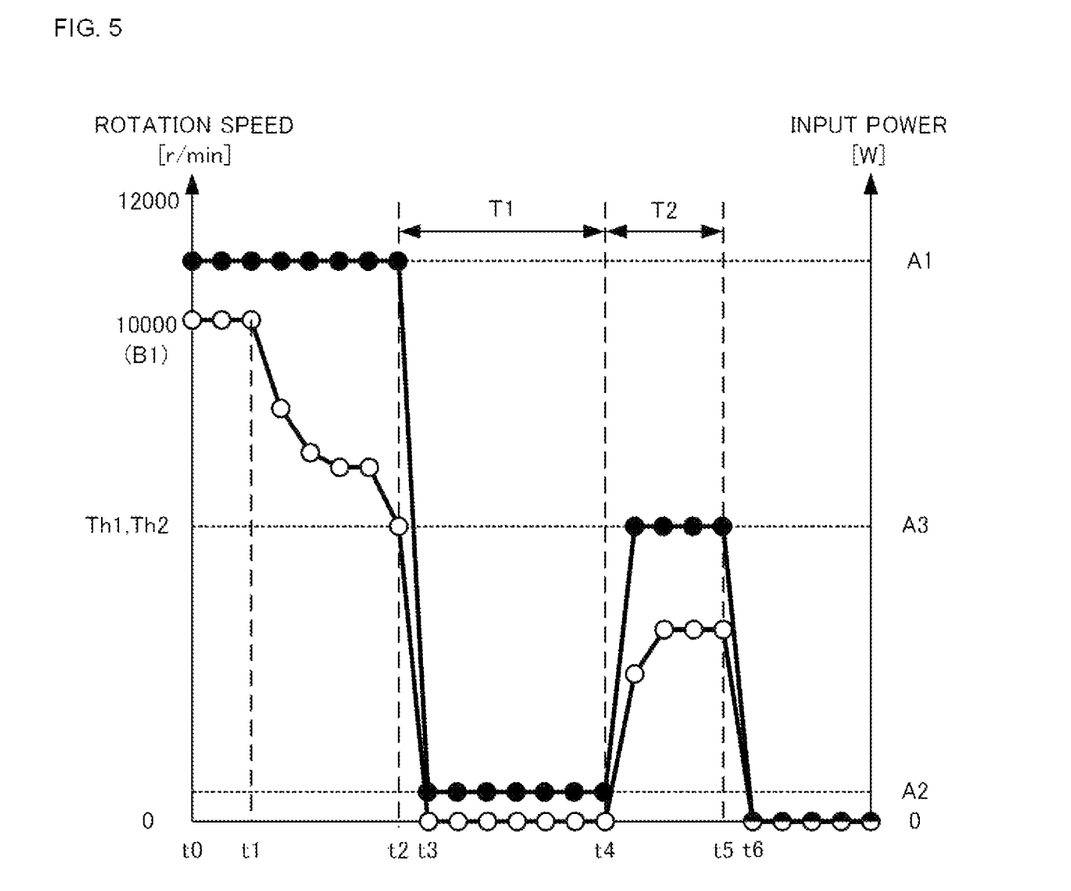
FIG. 5 is a graph showing another example of the relationship between rotation speed of the electric motor 6 and the input power.

FIG. 5 is a graph showing another example of the relationship between the rotation speed of the electric motor 6 and the input power. In the example shown in FIG. 5, the rotation speed of the electric motor 6 is changing as in the example in FIG. 4 until time t4, but at time t5, when the second period T2 has elapsed since the second switching control, the rotation speed becomes less than the second threshold Th2. In this case, the motor controller 13 stops power input to the electric motor 6 (input power is set to 0 W) from time t6 and controls the rotation speed of the electric motor 6 to 0 r/min.

In this manner, the motor controller 13 allows the input of electric power to the electric motor 6 to stop if the second period T2 elapses after the second switching control is performed and before the rotation speed of the electric motor 6 reaches or exceeds the second threshold Th2.

As the load on the cutting tool 8 increases, the rotational speed of the cutting tool 8 slows down, and the rotational speed of the electric motor 6 slows down accordingly. On the other hand, if the input power remains the same, energy that should be converted into rotational force is converted into heat, causing excessive heat generation, and the operation of the electric motor 6 is stopped to suppress excessive heat generation. Therefore, in the chain saw 1, when the load on the cutting tool 8 increases, the second switching control and the third switching control are performed to intentionally lower the maximum input power to the electric motor 6 before the operation of the electric motor 6 stops, and the rotation speed of the electric motor 6 is reduced.

This makes it easier for the operator to notice that the electric motor 6 is about to stop before the operation of the electric motor 6 actually stops due to excessive heat generation. The operator who realizes that the electric motor 6 is about to stop can then relax the force pressing the cutting tool 8 against the work object to return to the operation without stopping the electric motor 6.

Furthermore, by allowing the electric motor 6 to stop when the rotation speed does not increase after the second switching control as described above, when the load on the cutting tool 8 increases and the heat of the electric motor 6 increases, excessive heat generation can be prevented even if the load on the cutting tool 8 is not resolved.

In the first period T1, the rotation of the electric motor 6 decreases and rotation of the blower fan 9 also decreases. In the present embodiment, temperature in the housing shall increase in the first period T1 because stagnation of cooling air due to the decreased rotation of the blower fan 9 has a greater impact than suppression of temperature rising due to the decreased rotation of the electric motor 6. Then, when the first period T1 ends and the second switching control is performed, the rotation of the electric motor 6 shall increases and the rotation of the blower fan 9 shall increase as well in the future, and the cooling air shall start blowing again.

After the first switching control is performed, the earlier the operator notices that the electric motor 6 is about to stop and reduces the force pressing the cutting tool 8 against the work object, the faster the rotation speed of the electric motor 6 increases and the cooling air becomes stronger earlier, thereby suppressing the temperature rise inside the housing. In this manner, compared to the case where the first switching control is not performed, performing the first switching control can allow the operator to realize that the electric motor 6 is about to stop earlier than the operation of the electric motor 6 actually stops due to excessive heat generation.

In addition, by performing the second switching control, compared with the case where the second switching control is not performed, the blower fan 9 is restored while suppressing the heat generation of the electric motor 6, thus stoppage due to excessive heat generation of the electric motor 6 can be prevented. Further, since the operation of the electric motor 6 is controlled as described above while the operator continues to operate the lever 31, the operator does not need to re-grip the lever 31 and can concentrate on an amount of force pressing the cutting tool 8 against the work object.

By increasing the input power to the third power A3 by the second switching control, the driving force is applied to the cutting tool 8 to make the operator feel a response from the chain saw 1, and the operator can recognize that the electric motor 6 has not yet stopped. In this case, by making the third power A3 smaller than the first power A1, compared to the case where the third power A3 is larger than the first power A1, when the rotation of the cutting tool 8 that was stopped in the first period T1 is resumed, it is possible to suppress occurrence of phenomena such as kickback caused by sudden rotation with a strong force, and to enable safe continuation of work.

Other Embodiments (1) Electric Working Machine

In the present embodiment, a chain saw is described as an example of an electric working machine, but the present invention is not limited thereto. For instance, it may be a hedge trimmer, an engine cutter, or the like. In short, any type of electric working machine may be applied as long as it comprises a working portion operated by electric power supplied from a battery that is detachable to a main body. Although the motor controller 13 performed control by setting the second threshold Th2 to the same threshold as the first threshold Th1, the motor controller 13 may also perform control by setting the second threshold Th2 to a threshold different from the first threshold Th1.

(2) Temperature State

As described above, the electric motor 6 generates excessive heat when the load on the cutting tool 8 increases, and the higher the temperature of the electric motor 6 itself or surroundings, the higher the temperature due to excessive heat generation. Therefore, the motor controller 13 may acquire temperature information indicating temperature state of the electric motor 6 and allow a first parameter used for controlling the rotation speed of the electric motor 6 to change based on the acquired temperature information. The first parameter includes, for example, the first threshold Th1, the second threshold Th2, the first period T1, the second period T2, the second power A2, or the third power A3.

The temperature information is, for instance, information indicating temperature the electric motor 6 itself. In this case, the chain saw 1 comprises a temperature sensor that detects temperature of the electric motor 6, for example. The temperature sensor may be a contact type or a non-contact type, and the temperature information indicating measured temperature of the electric motor 6 is supplied to the motor controller 13. The temperature information is not limited to information directly indicating the temperature of the electric motor 6. For example, information indicating temperature of the control board of the control unit 10 or temperature of an inner surface of the housing of the main body 2 may be used as temperature information. This is because the control board and the inner surface of the housing are located in a space close to the electric motor 6, thus the temperature rises and falls in the same manner as the electric motor 6.

The motor controller 13 allows the first parameter to change using a first table that associates the temperature information of the electric motor 6 with each first parameter.

Figure 6:
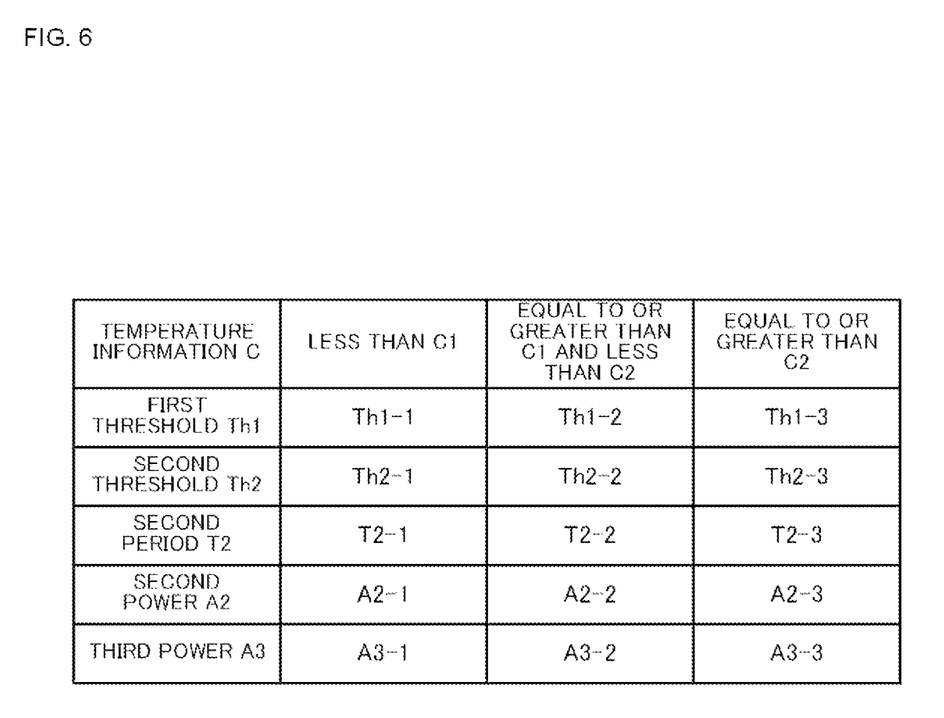
FIG. 6 is a diagram showing an example of a first table.

FIG. 6 is a diagram showing an example of the first table. In the example shown in FIG. 6, temperature information C is shown as "less than C1," "equal to or greater than C1 and less than C2," and "equal to or greater than C2". The higher temperature state the temperature information C indicates, the higher the temperature of the electric motor 6 tends to be when the load on the cutting tool 8 increases.

The temperature information C is associated with the first threshold Th1 shown as "Th1-1", "Th1-2", and "Th1-3" and the second threshold Th2 shown as "Th2-1", "Th2-2", and "Th2-3". Further, the temperature information C is associated with the second period T2 shown as "T2-1", "T2-2", and "T2-3". Moreover, the temperature information C is associated with the second power A2 shown as "A2-1", "A2-2", and "A2-3" and the third power A3 shown as "A3-1", "A3-2", and "A3-3".

For instance, the first threshold Th1 is defined to be Th1-1<Th1-2<Th1-3. As a result, since the first threshold Th1 increases as the temperature of the electric motor 6 tends to become higher, the timing at which the first switching control is performed is advanced, and the rotation speed is decreased before the electric motor 6 generates excessive heat, or a state in which the electric motor 6 generates excessive heat can be terminated early. Further, the second threshold Th2 is defined to be Th2-1<Th2-2<Th2-3. As a result, since the second threshold Th2 increases as the temperature of the electric motor 6 tends to become higher, timing for performing the third switching control and returning to the third power A3 is delayed, and time for cooling the electric motor 6 can be lengthened.

Further, the second power A2 is defined to be A2-1>A2-2>A2-3. This allows the electric motor 6 to cool down more easily in the first period T1 because the input power (second power A2) in the first period T1 becomes smaller as the temperature of the electric motor 6 tends to become higher. Moreover, the third power A3 is defined to be A3-1>A3-2>A3-3. As a result, it is possible to achieve a balance between suppressing an excessive rise in the temperature of the electric motor 6 and facilitating recognition of continuation of the operation of the chain saw 1.

The second period T2 is defined to be T2-1>T2-2>T2-3. As a result, the second period T2 becomes shorter as the temperature of the electric motor 6 tends to become higher, in such a manner that the input power to the electric motor 6 is likely to be stopped and working pace of the electric working machine decreases, thus failure due to excessive heat generation of the electric motor 6 is less likely to occur.

The greater the driving force by the electric motor 6, the better for the work, but when the rotation speed is decreased due to the load on the cutting tool 8, it may cause excessive heat generation. Therefore, as described above, by changing the first parameter based on the temperature information, the driving force can be increased as much as possible, while the driving force can be suppressed to reduce heat generation in situations where the temperature is likely to become too high. In other words, it is possible to balance the suppression of heat generation of the electric motor 6 and the driving force generated by the electric motor 6.

(3) State of Charge of Battery

The electric motor 6 operates with power supplied from the battery 4. The motor controller 13 may allow a second parameter used for controlling the rotation speed of the electric motor 6 to change according to SoC (State of charge) of the battery 4. SoC of battery is represented, for example, by remaining capacity or charging rate of the battery. The second parameter includes, for example, the first threshold Th1, the second threshold Th2, the first period T1, the second period T2, the second power A2, or the third power A3.

The motor controller 13 acquires SoC information indicating the SoC of the battery 4 from the battery 4. The SoC information is, for example, information indicating SoC of battery 4 with a numerical value from 0% to 100%. The motor controller 13 allows the second parameter to change using a second table that associates the SoC information of the battery 4 with each second parameter.

Figure 7:
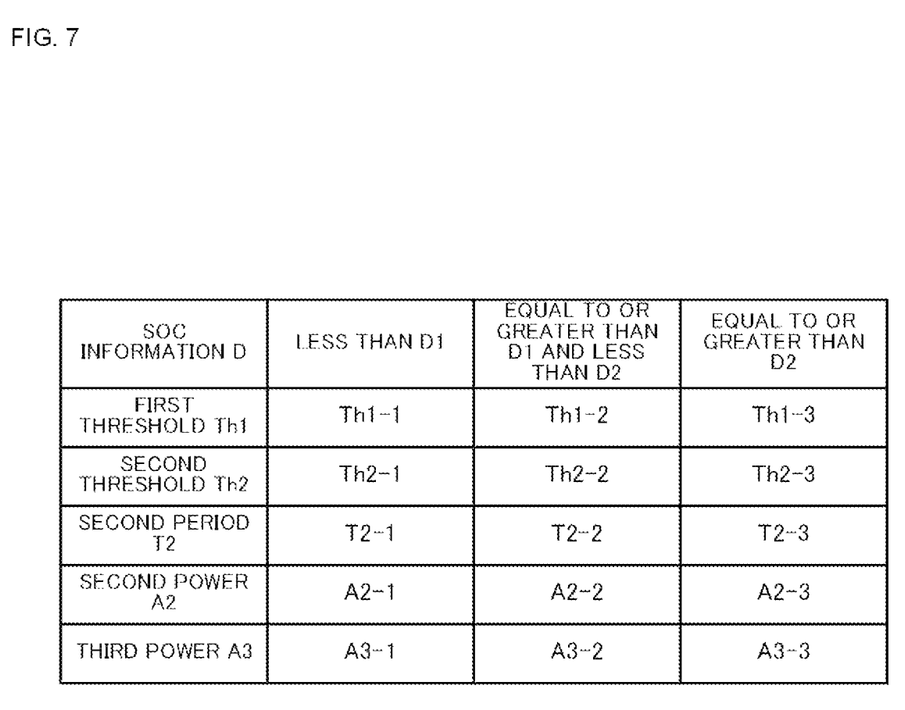
FIG. 7 is a diagram showing an example of a second table.

FIG. 7 is a diagram showing an example of the second table. The example in FIG. 7 shows SoC information D as "less than D1", "equal to or greater than D1 and less than D2", and "equal to or greater than D2". The SoC information D is associated with the same value as the first threshold Th1, the second threshold Th2, the second period T2, the second power A2, or the third power A3 shown in FIG. 6, respectively.

For example, the first threshold Th1 is defined to be Th1-1>Th1-2>Th1-3. As a result, the less the SoC of the battery 4 is, the larger the first threshold Th1 becomes, which accelerates the timing at which the first switching control is performed, thereby reducing power consumption and extending operating time of the electric motor 6. Moreover, the second threshold Th2 is defined to be Th2-1>Th2-2>Th2-3. As a result, the lower the SoC of the battery 4 is, the larger the second threshold Th2 becomes, and the timing at which the third switching control is performed to return to the third power A3 is delayed, which allows the SoC of the battery 4 to be preserved.

The second period T2 is defined to be T2-1<T2-2<T2-3. This makes it easier for the input power to be stopped as the lower the SoC of the battery 4 is, thereby making it less likely that the electric motor 6 suddenly stops due to lack of power while in use.

The second power A2 is defined to be A2-1<A2-2<A2-3. As a result, the lower the SoC of the battery 4 is, the smaller the input power (second power A2) in the first period T1 becomes, thus reducing the power consumption in the first period T1. The third power A3 is defined to be A3-1<A3-2<A3-3. As a result, it is possible to achieve a balance between suppressing power consumption of the electric motor 6 and facilitating recognition of continuation of the operation of the chain saw 1.

The greater the driving force by the electric motor 6 is, the better for the work, but it causes the operating time to be shorter in a situation where the SoC of battery 4 is low. Therefore, as described above, by allowing the second parameter to change based on the SoC information D, the driving force can be increased as much as possible, while the driving force can be suppressed to reduce power consumption in a situation where the SoC of the battery 4 is low. In other words, the driving force of the electric motor 6 can be balanced with the operating time.

(4) Hardness of Work Object

The harder the work object is, the greater the load on the cutting tool 8 is likely to be. As the load on the cutting tool 8 increases, the rotation speed of the cutting tool 8 and the electric motor 6 decrease, and the electric motor 6 tends to generate heat. Therefore, the motor controller 13 may determine hardness of the work object and allow a third parameter used for controlling the rotation speed of the motor to change based on the determined hardness.

For example, the motor controller 13, determines the hardness of the work object based on a history of time from when the second switching control is performed until when the third switching control is performed (hereinafter referred to as "inter-control time"). The inter-control time is time required for the rotation speed, once reduced, to increase until it again exceeds the second threshold Th2, which is shorter as the load on the cutting tool 8 is smaller. Since the greater the load on the cutting tool 8 as the harder the work object, a longer inter-control time indicates that the work object is harder, and a shorter inter-control time indicates that the work object is softer. The motor controller 13 uses such a relationship to determine the hardness of the work object.

The third parameter includes the first threshold Th1, the second threshold Th2, the second power A2, or the third power A3. The motor controller 13 allows the third parameter to change using a third table that associates the inter-control time and the hardness of the work object with each third parameter.

Figure 8:
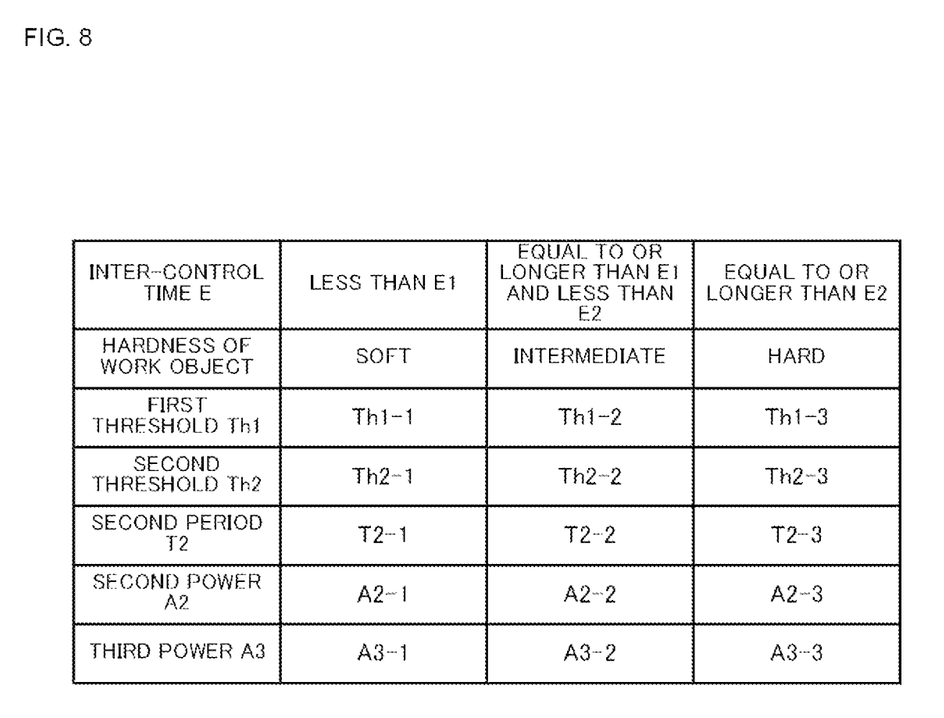
FIG. 8 is a diagram showing an example of a third table.

FIG. 8 is a diagram showing an example of the third table. In the example shown in FIG. 8, the hardness of the work target shown as "soft," "intermediate," and "hard," are associated with inter-control time E shown as "less than E1," "equal to or longer than E1 and less than E2," and "equal to or longer than E2". The hardness of the work object is associated with the same value as the first threshold Th1, the second threshold Th2, the second period T2, the second power A2, or the third power A3 shown in FIG. 6, respectively.

As mentioned above, the harder the work object is, the higher the temperature of the electric motor 6 tends to become when the load on the cutting tool 8 increases. Therefore, in the third table, each third parameter should be defined so as to indicate the same magnitude relationship as the first table shown in FIG. 6. For instance, in the case of the first threshold Th1, it should be defined so as to satisfy Th1-1<Th1-2<Th1-3. As a result, as in the example of FIG. 6, it is possible to achieve a balance between suppressing an excessive rise in the temperature of the electric motor 6 and facilitating recognition of continuation of the operation of the chain saw 1.

(5) Number of Stops

For instance, if the operator tends to press the cutting tool 8 hard against the work object, the rotation speed does not reach or exceed the second threshold Th2 in the second period T2, and an operation in A18 shown in FIG. 3 (stopping power input to the electric motor 6) is performed and the cutting tool 8 is easily stopped. Therefore, the motor controller 13 may allow a fourth parameter used for controlling the rotation speed of the electric motor 6 to change based on the number of times the cutting tool 8 stops. The fourth parameter includes the first threshold Th1, the second threshold Th2, the second power A2, or the third power A3.

The motor controller 13 stores the number of times the cutting tool 8 stops and adds 1 to the stored number of stops each time the operation in A18 is performed. The motor controller 13 allows the fourth parameter to change using a fourth table that associates the stored number of times the cutting tool 8 with each fourth parameter.

Figure 9:
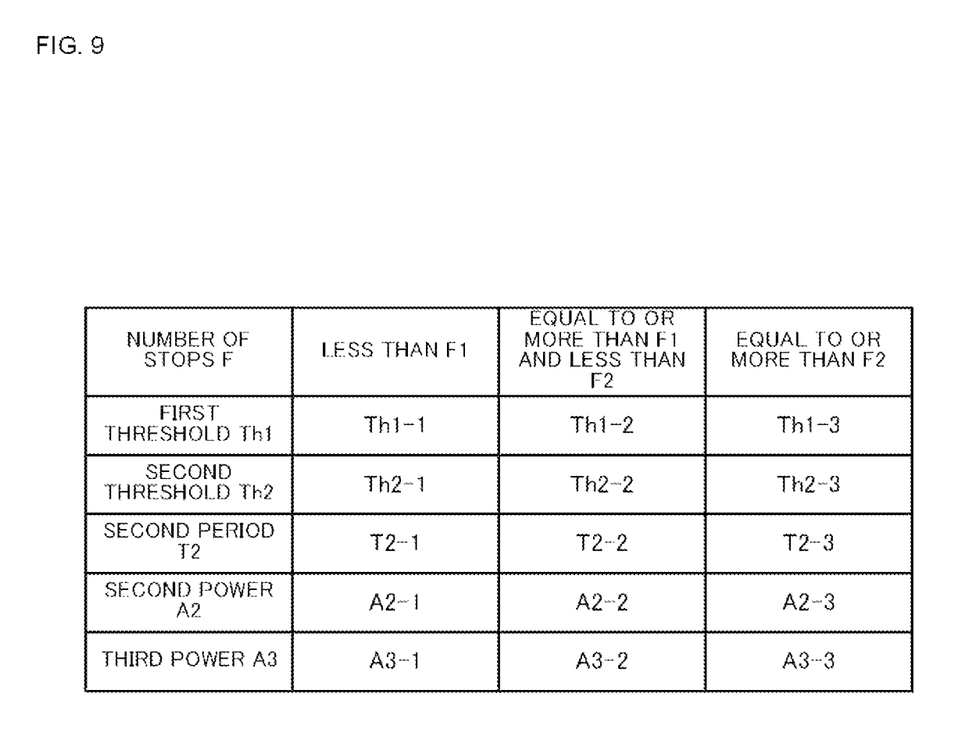
FIG. 9 is a diagram showing an example of a fourth table.

FIG. 9 is a diagram showing an example of the fourth table. In the example shown in FIG. 9, the number of stops F is indicated as "less than F1", "equal to or more than F1 and less than F2", and "equal to or more than F2". The number of stops F is associated with the same value as the first threshold Th1, the second threshold Th2, the second period T2, the second power A2, or the third power A3 shown in FIG. 6, respectively.

As the number of stops F of the cutting tool 8 increases, the load on the cutting tool 8 tends to increase during work, and the temperature of the electric motor 6 also tends to be higher. Therefore, in a fifth table, each fifth parameter should be defined so as to indicate the same magnitude relationship as in the first table shown in FIG. 6. For example, in the case of the first threshold Th1, it should be defined as Th1-1<Th1-2<Th1-3. As a result, as in the example of FIG. 6, it is possible to achieve a balance between suppressing an excessive rise in the temperature of the electric motor 6 and facilitating recognition of continuation of the operation of the chain saw 1.

(6) Power Saving Mode

The chain saw 1 may comprises a power saving mode. In this case, the motor controller 13 is configured to control the electric motor 6 by a first mode in which the cutting tool 8 is driven with normal power consumption and a second mode in which the cutting tool 8 is driven with less power consumption than in the first mode. Then, the motor controller 13 uses less third power A3 in the second mode than in the first mode.

Figure 10:
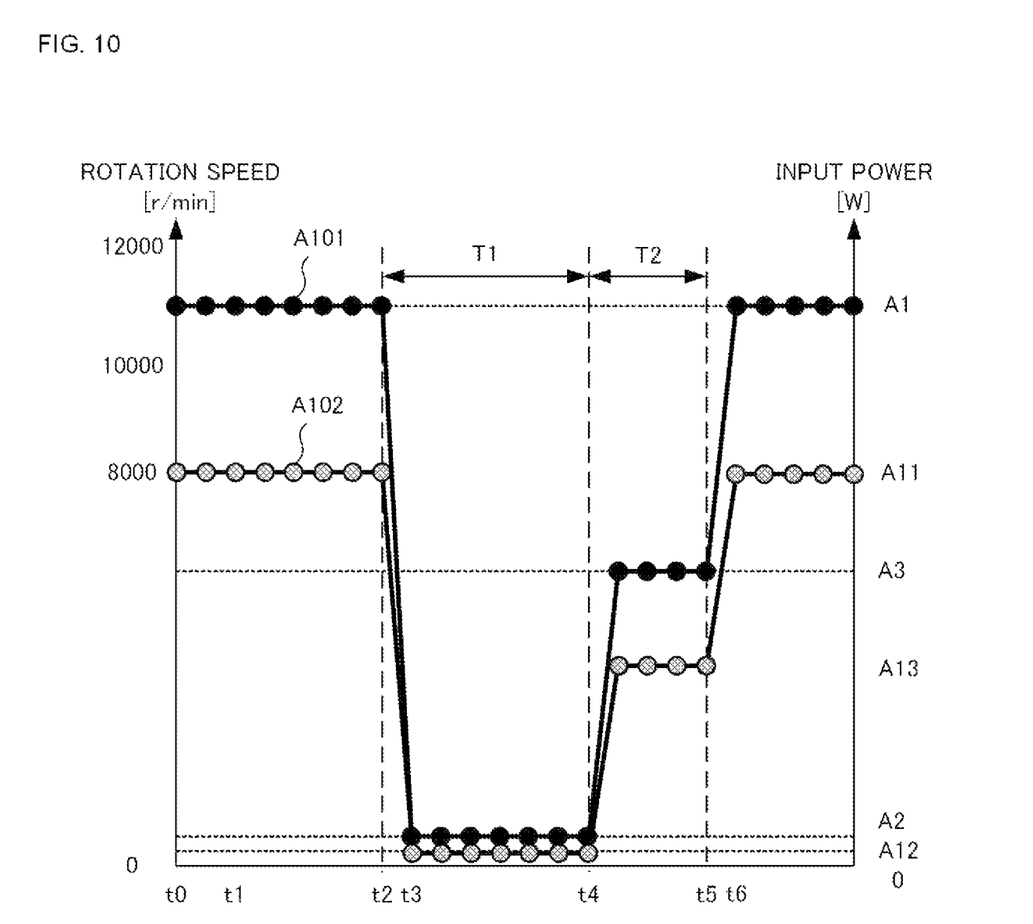
FIG. 10 is a graph showing an example of change in the input power of the electric motor 6.

FIG. 10 is a graph showing an example of change in input power of the electric motor 6. In the example shown in FIG. 10, a change in input power shown in FIG. 4 is indicated by a polygonal line A101 connecting a black circle. The polygonal line A101 shall indicate a change in input power in the first mode. And in FIG. 10, a polygonal line A102 shows a change in input power in the second mode.

In the first mode, as described in the embodiment, the input power in the second period T2 is set to the third power A3 to provide driving force to the cutting tool 8 and to make the operator aware that the electric motor 6 has not yet stopped.

Here, in the second mode, if the second switching control switches to the same third power A3 as in the first mode, since the operator feels the same response as when working in the first mode, the operator may hesitate whether to return to the first mode or the second mode afterward. In the example shown in FIG. 10, the third power A3 is less in the second mode than in the first mode, thus the response after the second switching control is different between the first mode and the second mode. As a result, the operator can be less likely to be confused about which mode is the current mode during work.

APPENDIX

Further, the present invention may be provided with each of the following aspects.

(1) An electric working machine, comprising: a motor; an operation portion configured to be operated by an operator; a working portion configured to be driven by the motor and act on a work target; and a controller configured to control a maximum power that can be input to the motor to a first power when receiving an operation signal indicating an amount of operation to the operation portion, perform first switching control to switch the maximum power to a second power that is less than the first power when rotation speed of the motor becomes less than a first threshold due to a load on the working portion, perform second switching control to switch the maximum power to a third power that is greater than the second power when a first period elapses from the first switching control, and perform third switching control to switch the maximum power to the first power when rotation speed of the motor becomes equal to or higher than a second threshold after performing the second switching control.

According to such an aspect, heat generation of the motor can be suppressed.

(2) In the electric working machine described in (1) above, the third power is less than the first power.

According to such an aspect, work can be continued safely.

(3) In the electric working machine described in (1) or (2) above, the controller is configured to allow power input to the motor to stop when a second period elapses from the second switching control before rotation speed of the motor reaches or exceeds a second threshold.

According to such an aspect, excessive heat generation can be prevented even if load on the working portion is not eliminated.

(4) In the electric working machine as described in any one of (1) to (3) above, the controller is configured to acquire temperature information indicating a temperature state of the motor, and to allow a first parameter used for controlling rotation speed of the motor to change based on the acquired temperature information, the first parameter including the first threshold, the second threshold, the second power, or the third power.

According to such an aspect, it is possible to balance suppression of heat generation of the motor and the driving force.

(5) In the electric working machine as described in any one of (1) to (4) above, the motor is configured to operate by power supplied from a battery, and the controller is configured to allow a second parameter used for controlling rotation speed of the motor to change based on a state of charge of the battery, the second parameter including the first threshold, the second threshold, the second power, or the third power.

According to such an aspect, it is possible to balance driving force of the motor and operating time.

(6) In the electric working machine as described in any one of (1) to (5) above, the controller is configured to determine hardness of the work target based on a history of time from when the second switching control is performed until when the third switching control is performed, and to allow a third parameter used for controlling rotation speed of the motor to change based on the determined hardness, the third parameter including the first threshold, the second threshold, the second power, or the third power.

According to such an aspect, it is possible to balance suppression of heat generation of the motor and the driving force.

(7) In the electric working machine as described in any one of (1) to (6) above, the controller is configured to allow a fourth parameter used for controlling rotation speed of the motor to change based on a number of times the working portion is stopped, the fourth parameter including the first threshold, the second threshold, the second power, or the third power.

According to such an aspect, it is possible to balance suppression of heat generation of the motor and the driving force.

(8) In the electric working machine as described in any one of (1) to (7) above, the controller is configured to control the motor by a first mode that allows the working portion to drive with normal power consumption and a second mode that allows the working portion to drive with less power consumption than the first mode, wherein in the case of the second mode, the third power is less than in the case of the first mode.

According to such an aspect, it is possible to avoid confusion about current mode during work.

Of course, the present invention is not limited to these aspects.

Further, the above-mentioned embodiments and variations may be implemented in any combination.

Finally, various embodiments of the present invention have been described, but these are presented as examples and are not intended to limit the scope of the invention. The novel embodiment can be implemented in various other forms, and various omissions, replacements, and changes can be made without departing from the abstract of the invention. The embodiment and its modifications are included in the scope and abstract of the invention and are included in the scope of the invention described in the claims and the equivalent scope thereof.

What is claimed is:

1. An electric working machine, comprising:
a motor;
an operation portion configured to be operated by an operator;
a working portion configured to be driven by the motor and act on a work target; and
a controller configured to
control a maximum power that can be input to the motor to a first power when receiving an operation signal indicating an amount of operation to the operation portion,
perform first switching control to switch the maximum power to a second power that is less than the first power when rotation speed of the motor becomes less than a first threshold due to a load on the working portion,
perform second switching control to switch the maximum power to a third power that is greater than the second power when a first period elapses from the first switching control, and
perform third switching control to switch the maximum power to the first power when rotation speed of the motor becomes equal to or higher than a second threshold after performing the second switching control.

2. The electric working machine according to claim 1, wherein:
the third power is less than the first power.

3. The electric working machine according to claim 1, wherein:
the controller is configured to allow power input to the motor to stop when a second period elapses from the second switching control before rotation speed of the motor reaches or exceeds a second threshold.

4. The electric working machine according to claim 1, wherein:
the controller is configured to acquire temperature information indicating a temperature state of the motor, and to allow a first parameter used for controlling rotation speed of the motor to change based on the acquired temperature information, the first parameter including the first threshold, the second threshold, the second power, or the third power.

5. The electric working machine according to claim 1, wherein:
the motor is configured to operate by power supplied from a battery, and
the controller is configured to allow a second parameter used for controlling rotation speed of the motor to change based on a state of charge of the battery, the second parameter including the first threshold, the second threshold, the second power, or the third power.

6. The electric working machine according to claim 1, wherein:
the controller is configured to determine hardness of the work target based on a history of time from when the second switching control is performed until when the third switching control is performed, and to allow a third parameter used for controlling rotation speed of the motor to change based on the determined hardness, the third parameter including the first threshold, the second threshold, the second power, or the third power.

7. The electric working machine according to claim 1, wherein:
the controller is configured to allow a fourth parameter used for controlling rotation speed of the motor to change based on a number of times the working portion is stopped, the fourth parameter including the first threshold, the second threshold, the second power, or the third power.

8. The electric working machine according to claim 1, wherein:
the controller is configured to control the motor by a first mode that allows the working portion to drive with normal power consumption and a second mode that allows the working portion to drive with less power consumption than the first mode, wherein in the case of the second mode, the third power is less than in the case of the first mode.

* * * * *